United States Patent [19]
Faris

[11] Patent Number: 5,537,144
[45] Date of Patent: Jul. 16, 1996

US005537144A

[54] ELECTRO-OPTICAL DISPLAY SYSTEM FOR VISUALLY DISPLAYING POLARIZED SPATIALLY MULTIPLEXED IMAGES OF 3-D OBJECTS FOR USE IN STEREOSCOPICALLY VIEWING THE SAME WITH HIGH IMAGE QUALITY AND RESOLUTION

[75] Inventor: Sadeg M. Faris, Pleasantville, N.Y.

[73] Assignee: Revfo, Inc., Hawthorne, N.Y.

[21] Appl. No.: 126,077

[22] Filed: Sep. 23, 1993

Related U.S. Application Data

[63] Continuation of Ser. No. 536,190, Jun. 11, 1990, abandoned.
[51] Int. Cl.$^6$ .................................................... H04N 13/04
[52] U.S. Cl. ............................ 348/58; 348/54; 359/465; 353/8
[58] Field of Search ............................ 348/42, 51, 52, 348/53, 54, 55, 56, 57, 58, 59, 60; 359/462–469; 353/8; H04N 7/18, 15/00, 13/04

[56] References Cited

U.S. PATENT DOCUMENTS

| | | |
|---|---|---|
| 1,435,520 | 11/1922 | Hammond . |
| 2,099,694 | 11/1937 | Land . |
| 2,301,254 | 11/1942 | Carnahan . |
| 2,317,675 | 9/1945 | Athey et al. . |
| 2,385,687 | 11/1945 | Canahan . |
| 2,417,446 | 3/1947 | Reynolds . |

(List continued on next page.)

FOREIGN PATENT DOCUMENTS

| | | |
|---|---|---|
| 5389959 | 3/1980 | Japan . |
| 59264515 | 6/1986 | Japan . |
| 6159555 | 9/1987 | Japan . |
| 489888 | 8/1938 | United Kingdom . |
| 1523436 | 8/1978 | United Kingdom . |
| 2111798 | 7/1983 | United Kingdom . |
| 2231754 | 11/1990 | United Kingdom . |

OTHER PUBLICATIONS

"Stereoscopic real–time and multiplexed video system" by Lenny Lipton, StereoGraphics Corporation, published in SPIE vol. 1915, Stereoscopic Displays and Applications IV, pp. 6–11, Feb., 1993.

Technical Brochure for the SGS 310, 410, 610 Stereoscopic 3–D Display Kits, published Jun. 1992 from Tektronix Display Products, Beaverton, Oregon.

(List continued on next page.)

*Primary Examiner*—Safet Metjahic
*Assistant Examiner*—Michael H. Lee
*Attorney, Agent, or Firm*—Thomas J. Perkowski

[57] ABSTRACT

An electro-optical display system for visually displaying a polarized spatially multiplexed image (SMI) of a 3-D object for use in stereoscopic viewing thereof with high image quality and resolution. In the illustrative embodiment, electro-optical display system comprises a liquid crystal display device and a micropolarization panel of electrically-passive construction. The liquid crystal display device has a display surface for visually displaying a composite pixel pattern representative of a spatially multiplexed image composed of first and second spatially modulated perspective images of the object, consisting of first and second pixel patterns. The micropolarization panel includes an optically transparent laminate portion and an optically transparent substrate portion which is in direct physical contact with the laminate portion. First and second optically transparent patterns are permanently formed in the optically transparent laminate portion. The first optically transparent pattern spatially corresponds to and is spatially aligned with the first pixel pattern displayed on the display surface so as to impart a first polarization state $P_1$ to light emanating from the first pixel pattern and passing through the first optically transparent pattern. The second optically transparent pattern spatially corresponds to and is spatially aligned with the second pixel pattern displayed on the display surface so as to impart a second polarization state $P_2$ to light emanating from the second pixel pattern and passing through the second optically transparent pattern.

15 Claims, 11 Drawing Sheets

U.S. PATENT DOCUMENTS

| | | |
|---|---|---|
| 2,571,612 | 10/1951 | Rines. |
| 2,631,496 | 4/1953 | Rehorn. |
| 2,647,440 | 8/1953 | Rehorn. |
| 2,949,055 | 8/1960 | Blackstone. |
| 2,983,835 | 5/1961 | Frey. |
| 3,275,745 | 9/1966 | Var. |
| 3,371,324 | 2/1968 | Sinto. |
| 3,507,549 | 4/1970 | Land. |
| 3,741,626 | 6/1973 | Wentz. |
| 3,807,831 | 4/1974 | Soret. |
| 3,821,466 | 6/1974 | Roese. |
| 3,858,001 | 12/1974 | Bonne. |
| 3,944,351 | 3/1976 | Ito et al.. |
| 4,122,484 | 10/1978 | Tan. |
| 4,281,341 | 7/1981 | Byatt. |
| 4,286,286 | 8/1981 | Jurosson et al.. |
| 4,431,265 | 2/1984 | Benton. |
| 4,504,856 | 3/1985 | Jackman. |
| 4,523,226 | 6/1985 | Lipton et al.. |
| 4,562,463 | 12/1985 | Lipton. |
| 4,566,758 | 1/1986 | Bos. |
| 4,582,396 | 4/1986 | Bos et al.. |
| 4,583,117 | 4/1986 | Lipton. |
| 4,588,259 | 5/1986 | Sugiman. |
| 4,641,178 | 3/1953 | Street. |
| 4,670,744 | 6/1987 | Buzak. |
| 4,709,263 | 11/1987 | Brumage. |
| 4,719,507 | 1/1988 | Bos. |
| 4,723,159 | 2/1988 | Imsand. |
| 4,792,850 | 12/1988 | Lipton. |
| 4,873,572 | 10/1989 | Miyuzaki et al.. |
| 4,877,307 | 10/1989 | Kalmanash. |
| 4,943,852 | 6/1990 | Femano et al.. |
| 4,984,179 | 1/1991 | Waldern. |
| 4,995,718 | 2/1991 | Jachimonowicz et al.. |
| 5,007,715 | 4/1991 | Verhulst. |
| 5,113,285 | 5/1992 | Franklin. |

OTHER PUBLICATIONS

Article in NASA Tech Briefs, Sep. 1991, pp. 12–13, Describing CrystalEyes® stereo 3–D viewing system from StereoGraphics Corp., San Rapheal, CA.

"Large Screen Electro–stereoscopic Displays" by Lenny Lipton, published in SPIE vol. 1255 Large–Screen Projection Display II, pp. 108–113, Feb. 1990.

"Field–sequential Electronic Stereoscopic Projector" by Lenny Lipton, published in SPIE vol. 1081 Projection Display Technology Systems and Applications, pp. 94–100, Jan. 1989.

"Compatibility of Stereoscopic Video Systems with Broadcast Television Standards" by Lenny Lipton, published in SPIE vol. 1083 Three–Dimensional Visualization and Display Technologies, pp. 95–101, 1989.

"Field–Sequential Stereoscopic Viewing Systems Using Passive Glasses" by Bos, et al., published in Proceedings of the SID, vol. 30, No. 1, pp. 39–43, 1989.

"A Real–time Autostereoscopic Multiplanar 3D Display System" by Rodney Williams, et al. of Texas Instruments, Inc., published in SID 88 Digest, pp. 91–94, 1988.

"High–Performance 3D Viewing Systems Using Passive Glasses", by Philip Bos, published in SID 88 Digest, pp. 450–453, 1988.

"Experience with Stereoscopic Devices and Output Algorithms" by James S. Lipscomb, published in SPIE vol. 1083 Three–Dimensional Visualization and Display Technologies, pp. 28–34, 1989.

"3–D Comes Home" by Tom Waters, published in Discover, May 1988, pp. 30–32.

"Circular Polarization Image Selection for Timeplex Stereoscopic Video Devices" by Lenny Lipton, Stereographics Corporation, published in SPIE vol. 779 Display System Optics, May 1987, pp. 41–44.

"Three–dimensional TV with cordless FLC Spectacles" by W. J. Hartmann et al., published in Information Display, vol. 10, 1987, pp. 15–17.

"Holographic Display of Three–Dimensional Images" by Larry Hodges et al., published in Information Display, vol. 10, 1987, pp. 8–11.

"Hard copy for true three–dimensional images" by Larry Hodges, et al., published in Information Display, vol. 9, 1987, pp. 12–15,25.

"True three–dimensional CRT–based displays" by Larry Hodges, et al., published in Information Display, vol. 5, 1987, pp. 18–22.

"Holographic Micropatterns and the Ordering of Photographic Grains in Film Systems" (Abstract) by James Cowan, et al., published in ACTA Polytechnica Scandinavica, Applied Physics Series No. 149, Proceedings of Image Science '85, vol. 1, Jun. 1985.

"Three–dimensional Projection with Circular Polarizers" by Vivian Walworth, et al., published by SPIE vol. 462 Optics in Entertainment II, Jan. 1984, pp. 64–68.

"Varifocal Mirror Techniques for Video Transmission of Three–Dimensional Images" by M. C. King, et al., published in Applied Optics, vol. 9, No. 9, Sep. 1970, pp. 2035–2039.

Section 14.6.3 Dichroic Polarizers (pp. 716–718), in Principles of Optics (Fourth Edition) 1970, by Max Born and Emil Wolf, published by Pergamon Press, Oxford.

"A New Approach to Computer–Generated Holography" by M. C. King, et al., published in Applied Optics, vol. 9, No. 2, Feb. 1970, pp. 471–475.

Chapter 10, Section 10.1 Introduction to Polarized Light, Section 10.2 Methods of Producing Polarized Light, and Section 10.3 The Transverse Nature of Light (pp. 485–520), in Optics by Miles V. Klein, published by John Wiley & Sons, Inc. New York.

Chapter 8, Polarization pp. 394–450, in Waves: Berkeley Physics Course–vol. 3, by Frank S. Carwfrod, Jr.

"Low–Cost 3–D TV" in Electronics (Edited by Alexander A. McKenzie), Jul. 1953, at p. 1996.

Proposal entitled "3–D Flat Panel Color Display PRDA 89–9 Technical/Management and Cost" prepared for Directorate of R&D Contracting ASD/PMRNB, Wright–Patterson AFB, Ohio, by Honeywell Inc. Systems and Research Center, Phoenix Technology Center, Aug. 1989.

The 1993 product brochure entitled "Professional Products" from the 3D TV Corporation, of San Rafael, California (10 pages).

P1
P2

P1
P2

ELECTRO-OPTICAL DISPLAY SYSTEM FOR VISUALLY DISPLAYING POLARIZED SPATIALLY MULTIPLEXED IMAGES OF 3-D OBJECTS FOR USE IN STEREOSCOPICALLY VIEWING THE SAME WITH HIGH IMAGE QUALITY AND RESOLUTION

RELATED CASES

This is a continuation of application Ser. No. 07/536,190 filed Jun. 11, 1990, entitled "A System for Producing 3-D Stereo Images." now abandoned.

BACKGROUND OF THE INVENTION

1. Field of the Invention

This invention relates to the field of three dimensional (3-D) stereoscopic imaging and display technologies in general and relates more particularly to stereoscopic photography, television, motion picture, printing and computer displays.

2. Description of Related Art

The binocular vision of humans perceives the real world as 3-D images. This fact results from a combination of the physiological and psychological properties of the human pair of eyes. The pair of eyes is the most important source of depth perception. Because of its spherical shape, the retina of a single eye collects only two-dimensional image information. Therefore, cues of the third dimension (depth) can never be collected by the retina of a single eye.

The inventions of printing (1450) and photography (1839) enabled man to cheaply mass-produce pictures for popular use. There has always been the awareness that these technologies lacked the third dimension (depth), and therefore, the desire to invent ways to faithfully capture and reproduce nature as 3-D images has persisted throughout the ages. Around the year 1600, Giovanni Battista della Porta produced the first artificial 3-D drawing. The history and evolution of 3-D imaging techniques are surveyed in T. Okoshi, Three-Dimensional Imaging Techniques, Academic Press, New York, 1976, and T. Okoshi, Three Dimensional Displays, Proc. IEEE, 68, 548 (1980). Accounts of the most recent activities in 3-D technologies were recently presented in the Conference on Three-Dimensional Visualization and Display Technologies, in Los Angeles, Calif., Jan. 18–20, 1989 and published in the Proceedings of the International Society for Optical Engineers, SPIE volume 1083, edited by Woodrow E. Robbins and Scott S. Fisher.

3-D imaging is classified into two major classes: Autostereoscopic Imaging, a technique which produces 3-D images that can be viewed directly without the aid of wearing special eye-glasses; and Binocular Stereoscopic Imaging, a technique that requires wearing special eye-glasses.

Autostereoscopic Imaging

This 3-D class is further broken into four subclasses:

I.1 Parallax Barrier
I.2 Lenticular Sheet
I.3 Holographic
I.4 Multiplanar free viewing The operating principles of these techniques are reviewed in detail in Three-Dimensional Imaging Techniques. The Parallax Barrier technique is one of the earliest techniques and was experimented with in the first quarter of this century. However, because of its complexity and the dark images it produced, it fell out of favor and was abandoned. The Lenticular Sheet technique is still used today to produce 3-D color postcards. It requires multi-cameras or one camera with multiple lenses. The recording process is quite complex and the final product is obtained after four or more images with different perspectives of the object are aligned and mounted to a sheet of a clear plastic cylindrical micro-lens array. Vertical misalignment results in discomfort and headaches. The technique becomes expensive for large prints, and has significant technical problems. Because of the use micro-lenses, the image does not look the same to different viewers in different viewing positions. Also the depth information in the image can be distorted and can depart significantly from the original object. Finally, this technique cannot be used for TV, computer displays, or computer printers.

The Holographic technique described in Three-Dimensional Imaging Techniques and Three Dimensional Displays, and by L. F. Hodges et al. in Information Displays, 3, 9 (1987), has shown promise for still images but not for TV or movies. It requires very sensitive and expensive film, and is unable to produce large holograms because of sensitivity to vibration. Also, because of the requirement for coherent monochromatic sources for recording and reconstruction (viewing), it is difficult to produce full color holograms. Holography is very expensive and is not used for mass markets as in conventional photography.

The Multiplanar technique described by M. C. King and D. H. Berry, Appl. Opt., 9, May 1980; and R. D. Williams and F. Garcia Jr., SID Digest, 19, 91 (1988), is the only member of the Autostereoscopic class which has a commercial product. It uses a verifocal mirror 1 which is a reflective membrane mounted on a speaker 2 as shown in FIG. 1. The speaker 2 causes the membrane to vibrate and to vary the focal length of the mirror. When the image of a cathode ray tube (CRT) 3 is viewed through this mirror it appears as a 3-D image 4. The information of the third dimension (depth) is represented by the different focal lengths which image different z planes of the original object. While this method has been successful in realizing a 3-D system for some special applications, it has serious limitations: i) it is not general purpose, i.e., the method cannot be used for 3-D hard copy production such as photography and printing; ii) it cannot be used for mass viewing as, for example, in a motion picture theatre; iii) it cannot be used for 3-D TV without making the massive investments in existing TV production equipment, broadcast equipment, TV sets, VCR, and other video equipment obsolete; and iv) has poor depth resolution given by the ratio of frame frequency to the mirror vibrating frequency. Other limitations such as cost and bulkiness, will limit the utility of this verifocal method.

Binocular Stereoscopic Imaging

This 3-D class has had the most relative success in narrow fields. To record an image, one generally requires two cameras, as illustrated in FIG. 2, one for the left image 5 and the other for the right image 6. In order to simulate the human stereoscopic vision, the cameras are separated by the pupil distance of 6.5 cm, which is the average distance between the two eyes. There are two techniques for coding the left/right information: Color Coding, as described in Three-Dimensional Imaging Techniques; and by L. Lipton, Foundations of the Stereo Cinema, Van Nostrand Reinhold, New York, 1982; and Polarization Coding, as described in Hartmann and Hikspoors, Information Displays, 3, 15 (1987); L. F. Hodges and D. F. McAllister, Information Displays, 5, 18 (1987); P. Bos et al., SID Digest, 19, 450 (1988).

Color Coding

In this technique, two different color filters 7,8 are placed in front of the cameras; for instance, green 8 in front of the left camera 5 and red 7 in front of the right camera. When the images are displayed as in FIG. 3, the viewer wears eye glasses 9 having the corresponding color filters, green, for the left eye, and red for the right eye. Thus, the left eye sees only the left image 10 (green image) of the object 15 taken by the left camera, while the right eye sees only the right image 11 (red image) taken by the right camera. This technique has been used for decades to produce movies with 3-D sensation and it can be used for 3-D TV. For real time TV (transmission and reception of live scenes), one requires extra hardware to synchronize TV cameras and to electronically combine the red with the green information before transmission. The TV receiver does not require any modification. This technique has several limitations:

1. It does not provide a full color display;
2. It has been shown to lead quickly to eye fatigue;
3. The image display is dark;
4. The filter eye glasses are dark and cannot be used to view the natural 3-D environment when the viewer turns away from the artificial 3-D scene;
5. Special new TV production equipment and transmission hardware are required; and
6. Vertical misalignment leads to eye discomfort, fatigue, and headaches.

Polarization Coding

Electromagnetic plane waves have electric and magnetic fields which are transverse to the propagation direction, as shown in FIG. 4. There are two possible orientations for each of the electric and magnetic fields. These orientations are called polarization states. The E1 and H1 transverse fields represent one wave having polarization P1 while the E2 and H2 transverse fields represent another independent wave having polarization P2 which is perpendicular to P1 as shown in FIG. 4.

Light from the sun, fluorescent lamps and incandescent bulbs is unpolarized, and is represented by electromagnetic plane waves which are an incoherent mixture of wavelengths, polarizations, amplitudes, and phases. Half of this light energy (luminance, or brightness) is in one polarization state, P1, while the other half is in other polarization state, P2. These two states of polarization are linear. Using quarter wave retarders with P1 and P2 states produce two circular polarization states, one is clockwise and the other is counterclockwise.

It is possible to turn unpolarized light into linearly polarized light by one of three well known means: 1) Nicol prisms; 2) Brewster Angle (condition of total internal reflection in dielectric materials); and 3) Polaroid film. These are called linear polarizers. The most inexpensive and widely used polarizers are the Polaroid films. They are made of polyvinyl alcohol (PVA) sheets stretched between 3 to 5 times their original length and treated with iodine/potassium iodide mixture to produce the dichroic effect. This effect is responsible for heavily attenuating (absorbing) the electric field components along the stretching direction while transmitting the perpendicular electric field components. Therefore, if P1 is along the stretching direction of the PVA sheets, it is not transmitted, where as only P2 is transmitted, producing polarized light. By simply rotating the PVA sheet 90 degrees, P1 state will now be transmitted and P2 will be absorbed.

The two polarization states of light, P1 and P2, can be used to encode the left image and separately the right image to produce 3-D sensation, see L. Lipton, Foundations of the Stereo Cinema, Van Nostrand Reinhold, New York, 1982 and V. Walwarth et al., SPIE Optics in Entertainment, Volume 462, 1984. The arrangement of FIG. 2 without the filters 7,8 is used to record the left and right images separately. To reconstruct and view the images, the arrangement in FIG. 3 is used. The P1 polarizer 13 is placed in front of the left image 10 and in front of the left eye of the viewers eye glasses 9, and P2 polarizer 12 in front of right image 11 and in front of the right eye. The half-silvered mirror 14 is used to combine the left and right images. The viewers left eye sees only the left image because its polarizer P1 blocks the right image state of polarization P2. Similarly, the right eye sees only the right image. The brain fuses both images to perceive 3-D sensation.

This polarization coding technique, unlike the color coding, can reproduce color and therefore is considered the most promising for widespread applications. However, the arrangements (parallel field technique) shown in FIGS. 2 and 3 require two image sources, i.e., two CRTs or two computer displays, two movie projectors, or two slide projectors in addition to the half-silvered mirror combiner which loses half the brightness. For TV, it requires major investment in new production and transmission hardware because two separate channel frequencies are required for the left and right images.

As early as the 1940s, attempts were made to improve the polarization encoding technique by eliminating the need for two image sources during image reconstruction and viewing. As disclosed in U.S. Pat. No. 2,301,254 to Carnahan and U.S. Pat. No. 2,317,875 to Athey, et al., left and right perspective images of a three-dimensional object are effectively combined into a single composite image referred to therein as an "interlined stereogram". As disclosed in these prior art references, the composite image is produced during an image recording process by (1) recording left and right perspective images, (2) spatially-filtering these perspective images using complimentary optical masks, and thereafter (3) optically combining the spatially-filtered perspective images to produce the composite image. In its final form, the composite image contains thin spatially alternating image strips taken from the left and right perspective images. Then during the image reconstruction and viewing process, the composite image is displayed from a single image source (e.g. film projector) through a linear polarizing filter or screen consisting of vertically-interleaved cross-polarized light polarizing strips, physically aligned with the left and right image strips in the displayed composite image. As the composite image is being displayed through the light polarizing filter, the viewer views the polarized composite image through a pair of linear polarizing spectacles. In theory, the polarization encoding technique taught in these prior art references should permit one to view three-dimensional objects stereoscopically. In practice, however, an array of unsolved problems, relating to stereoscopic cross-talk and polarizing filter design and manufacture, has continued to prevent anyone from using this polarization encoding technique to build an image display system that permits stereoscopically viewing of three-dimensional imagery with high image quality and resolution.

Field Sequential Technique [J. S. Lipscomb, Proc. SPIE, 1083, 28 (1989)]: The major motivation to pursue this technique is to have a 3-D system that uses only one display screen (CRT) instead of two as was required in the parallel field arrangement of FIG. 3. This is accomplished by means of sequentially recording the left and the right scenes (fields) and then sequentially displaying them in the same order with proper synchronization. The sequential imaging, recording and displaying, require two fundamental pieces of hardware, during recording and during display. They are the time multiplexing electronics and the optical shutters or switches. As described by P. Bos et al., SID Digest, 19, 450 (1988), these shutters can be either electromechanical or electro-optical shutters. Electro-optical shutters are the most preferable and are used as representatives of the field sequential 3-D display prior art illustrated in FIGS. 5 and 6.

In FIG. 5 an electro-optical shutter 16 made of liquid crystal (LC) or piezo-electric (PZLT) crystal is placed in front of the left camera 5 and an identical shutter 17 in front of the right camera 6. The shutter electronics box 18 sends signals to these shutters to open them and close them sequentially at a predetermined frequency, fc. The video output 19 of the cameras 5,6 are combined by means of the time multiplexing electronics 20 and then sent to the transmitters, the processor or the display system. The two cameras and the shutters are driven by proper sync signals which also control the multiplexer 20. At the receiving end, to display the 3-D image, one needs an electro-optical shutter/polarization switch 22 in front of the CRT display 21 and a shutter controller box 23 and scan electronics 24 to drive the CRT. The display shutter has to be driven at the same frequency fc of the recording shutters 16,17. The LC shutter 22 switches to transmit the left scene with polarization P1 and the right scene with polarization P2 (P1 and P2 are either linear or circular polarizations). The viewer wears passive eye-glasses 9 with the corresponding states of polarization so that the left eye will see only the left scene and the right eye will see only the right scene, thus achieving the 3-D sensation. In FIG. 6, the LC shutter 22, which is the same size as the CRT, consists of a linear polarizer 25, the LC switch 26, and a quarter wave retarder 27. The eye-glasses 9 have two quarter-wave retarders 28 and two linear polarizers 29.

Because a large area LC shutter is very expensive, U.S. Pat. No. 4,562,463 by L. Lipton describes alternatives to the method of FIG. 6. These are shown in FIGS. 7 and 8. Instead of one large LC shutter in front of the CRT, two small LC shutters 30 are fixed to the eye-glasses 9. These shutters are either driven directly by a cable 31 (the viewer is teetered to the display system) FIG. 7, or by means of an infrared transmitter/receiver arrangement 32 shown in FIG. 8, and described by Hartmann and Hikspoors, Information Displays, 3, 15 (1987). The latter has a small battery fixed to the glasses to drive the receiver electronics 33 and the LC shutters 30. All the components within the dashed box 34 are mounted on the eye glasses 9 worn by the viewer.

Of all the 3-D prior art, the field sequential 3-D technique is considered state-of-the-art and is being used in some applications in conjunction with computer workstations, achieving acceptable 3-D sensation for those applications (see J. S. Lipscomb, Proc. SPIE, 1083, 28 (1989)). However, this technique has fundamental limitations which will confine it to a very narrow application niche. These limitations are:

1. Ghosting due to afterglow of the phosphors (slow decay) results in cross-talk between the left and right images affecting adversely the 3-D image quality.
2. The LC shutter is angle dependent, affecting the quality and color of the 3-D image when the viewer's head is moved, and when more than one viewer is present.
3. This technology cannot be adapted to hardcopy technologies such as plotting, computer printing, offset printing, instant photography, and conventional consumer photography.
4. The system is very complex and very expensive, needs multiplexing electronics, scan converters, LC shutters and LC controllers.
5. The technique cannot be used for TV. If the shutter frequency is compatible with. TV then the flicker is unacceptable. If the frequency is higher than 60 Hz then it is incompatible with all the existing TV infrastructure, production equipment transmission equipment, receivers and VCR's.
6. Freeze frame of live 3-D scenes is not possible.
7. The technique cannot be adapted to the conventional motion picture infrastructure without discarding the massive investment in existing facilities.

A hardcopy technique using polarization coding is described by Edwin Land in J. Opt. Soc. of America, 30, 230 (1940) and is called a vectograph. It is made of two sheets of stretched, unstained PVA material laminated together with their transmission axes perpendicular. If iodine based ink is used to draw an image on one side of this laminate, the area covered by ink will polarize light through it while all unpainted areas leave the light unpolarized. Drawing on the opposite side likewise produces an image in polarized light but with polarization oriented perpendicular to the first. For stereo images, the left perspective is recorded on the front side of the vectograph and the right perspective on the back side. The 3-D image is viewed by using polarized glasses.

The image recording process of vectograph is complex. It uses the method of dye transfer from matrix films. One matrix film is exposed with the image of the left perspective, developed and then filled with iodine/dye ink. The ink saturated matrix is then pressed onto the front side of the vectograph, transferring the ink to it. The image on the vectograph is in the form of spatial variations of the amplitude of the polarization vector. The process is repeated to create the image of the right perspective on the other side of the vectograph. For color vectograph, color separation methods are used. In this case the process is repeated eight times, four colors (cyan, magenta, yellow, black) for each perspective. These eight images must be carefully aligned, for any vertical misalignment leads to eye discomfort, fatigue and headaches. The alignment of images on both sides of the vectograph is a major problem.

Clearly, the vectograph cannot be used for TV, computer displays, or computer color printing. For this reason and the complexity and the cost of the vectograph process, its use is limited to special black and white 3-D hardcopy applications.

SUMMARY OF THE INVENTION

The present invention provides an improved method and apparatus for producing a 3-D image of an object comprising a spatial multiplexing for merging and recording two different views, e.g. left and right perspective views, of the object on a single medium as mutually interposed, distinct arrays of image elements, and spatial demultiplexing for separating and viewing the left and right perspectives with a left eye and a right eye, respectively.

The present invention introduces provides a novel a method of fabricating ultra-thin micropolarization panels for use in multiplexing and demultiplexing different perspective views of three-dimensional object.

The present invention comprises a 3-D technology that is straightforward in design, inexpensive to implement and can be used for a variety of general purpose imaging and displaying applications including consumer TV, motion picture, and computer 3-D graphics.

The present invention can be adapted to and is compatible with existing hardware technologies to produce inexpensive 3-D hardcopy images such as 3-D photography, and 3-D printing while completely eliminating electromechanical and optical shutters, time-multiplexing electronics, shutter controllers and scan frequency converters.

3-D images produced according to the present invention are high quality, clear images without the ghosting effects, flicker problems and the eye discomfort, fatigue and headaches which result from images produced using prior 3-D technologies.

DETAILED DESCRIPTION

Figure 9:
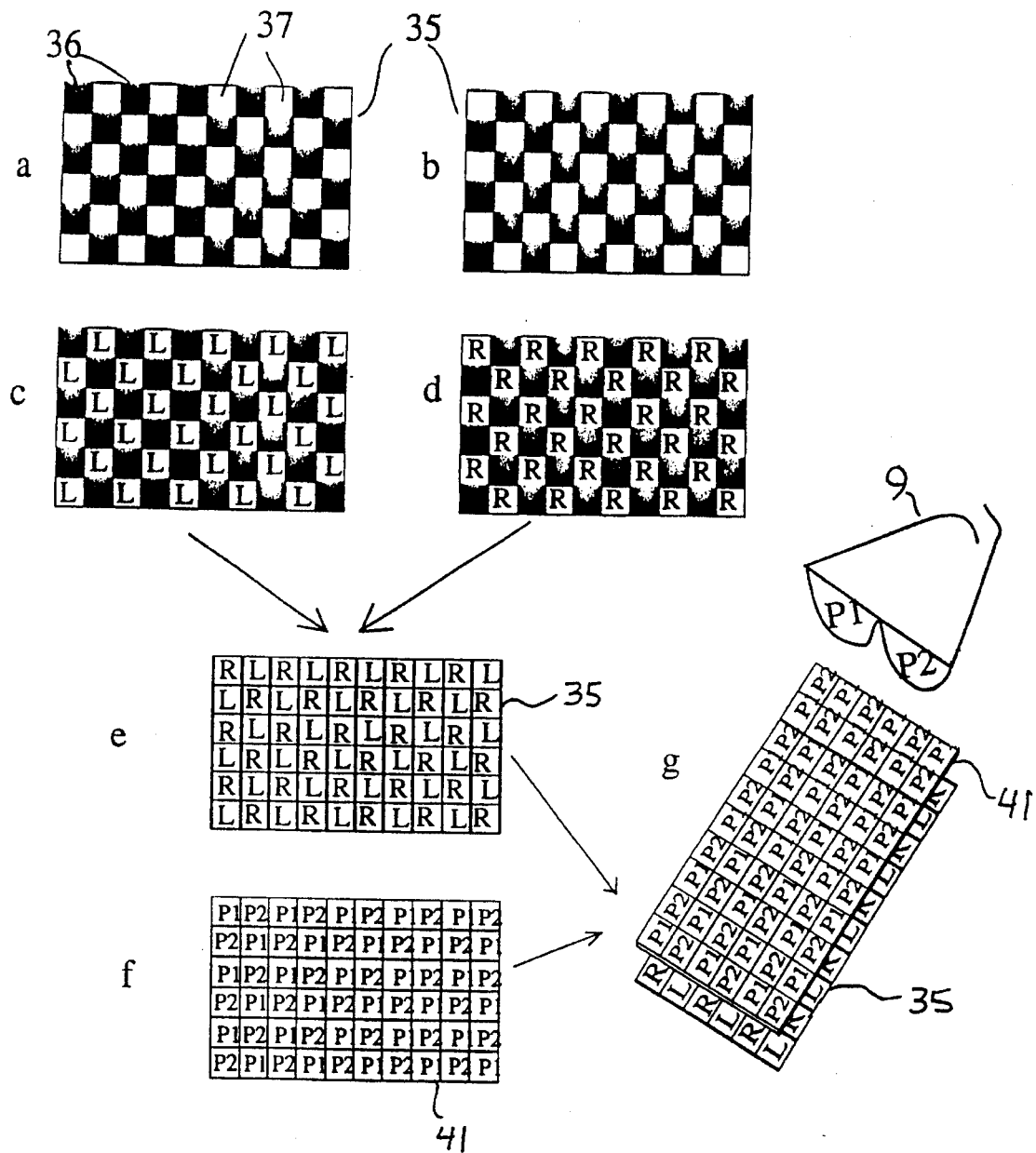
FIGS. 9 (a)–(g) illustrate basic principles of spatial multiplexing and micro-polarization according to the present invention.

The present invention relates to a novel method of and system for displaying polarized images formed using two principles, namely are spatial multiplexing of two or more perspective views of an object and micro-polarization. Spatial multiplexing is used during the recording or the displaying processes to place two different perspective views of an object, for example, left and right images, as mutually interposed, distinct arrays of image elements on the same recording or displaying medium (photographic plate, optical scanner, CCD imaging array, CRT screen, LCD, projection screen, printer paper and other media). FIG. 9 illustrates a spatial multiplexing of left and right images of an object.

The left image is projected onto the recording medium through a checkerboard patterned mesh 35 in FIG. 9a. The mesh is a regular two dimensional array of opaque 36 and clear squares 37 (other patterns are possible). The right image is projected through the right mesh of FIG. 9b which is the logical complement (the inverse) of that in FIG. 9a, i.e., if a square is opaque in a, then the square in the same position in b is clear. FIGS. 9c and 9d show the results of separately projecting the left and the right images respectively through their respective meshes. It is important to note that when the array period (i.e. image element or pixel size) is small, e.g., less than 0.1 mm, the eye perceives the full images through spatial integration, i.e., the dark squares will not be seen, but the overall image will be darker. This is the case as long as the viewing distance is at least 250 times the array period.

If the medium 35 is a photographic plate, and the left image is projected through its mesh, first, followed by the right image through its mesh, the result as recorded on the photographic plate is shown in FIG. 9e. This combined image of the left and right scenes on the same medium 35 is called a Spatially Multiplexed Image (SMI). The image merging process or spatial multiplexing is done with the image elements arranged on a pixel by pixel basis, subpixel basis, or super-pixel basis (more than one pixel) depending on the resolution required. The meshes of FIGS. 9a and 9b are spatial modulators and the pair of meshes is called a spatial multiplexer.

In order to perceive the 3-D sensation, the left eye of a viewer must see only the left image elements of the SMI, and the right eye must see only the right image elements. This separation (demultiplexing) is accomplished by means of a micro-polarizer, In accordance with the present invention, the micropolarizer is formed as an optically transparent sheet permanently embodying first and second optically transparent patterns. In the illustrative embodiments, these optically transparent patterns form a two dimensional regular array of polarizers which alternate between polarization state P1 and state P2 as shown in FIG. 9f. These polarization states could be linear or circular. The array period or size of each polarizer of the micropolarizer 41 is identical to that of the spatial multiplexers (the meshes) so that when the micropolarizer 41 is placed on top of the SMI 35, the periods match and perfect alignment is achieved. FIG. 9g shows the final 3-D product, which is a micropolarizer 41 aligned to and mounted onto the SMI 35 or fixed permanently (laminated) with a clear adhesive to the SMI. Now the viewer wears simple passive eye-glasses 9 with the right lens having the P1 polarizer and the left lens having P2 polarizer and he is able to separate (demultiplex) the left scene from the right scene and is able to perceive true 3-D sensation. Note that the μPol has just been described as a demultiplexer during the display and viewing process. In fact it will be used in an exemplary embodiment of the present invention as the spatial multiplexer during the recording process to produce the SMI instead of the meshes. If the right image is projected using light polarized with P1, through the micropolarizer, the image will be transmitted only through the squares with P1. The squares with P2 block the P1 polarized right image. Now we repeat the process by imaging the left image with P2 polarized light. The result of this is that only the P2 squares will transmit the image. Complete spatial multiplexing using the μPol is obtained when both the right P1 polarized image and the left P2 polarized image are projected through the micropolarizer and onto the recording medium.

As described below and in application Ser. No. 07/536, 419, now U.S. Pat. No. 5,327,285, entitled Methods of Manufacturing Micropolarizers, filed on even date herewith and incorporated herein by reference, the micropolarizers are specially fabricated plastic sheets which are very thin, e.g. about 0.25 millimeters, and can be made with different patterns and periods ranging from 25 microns to 5000 microns. The μPol sheets are cut into different sizes. They can be laminated easily onto SMI as on TV screens, movies screens, paper prints, and photographs. Because they are very thin, μPols can easily be placed inside conventional cameras right in front of the photosensitive elements with hardly any modification to these cameras.

Figure 10:
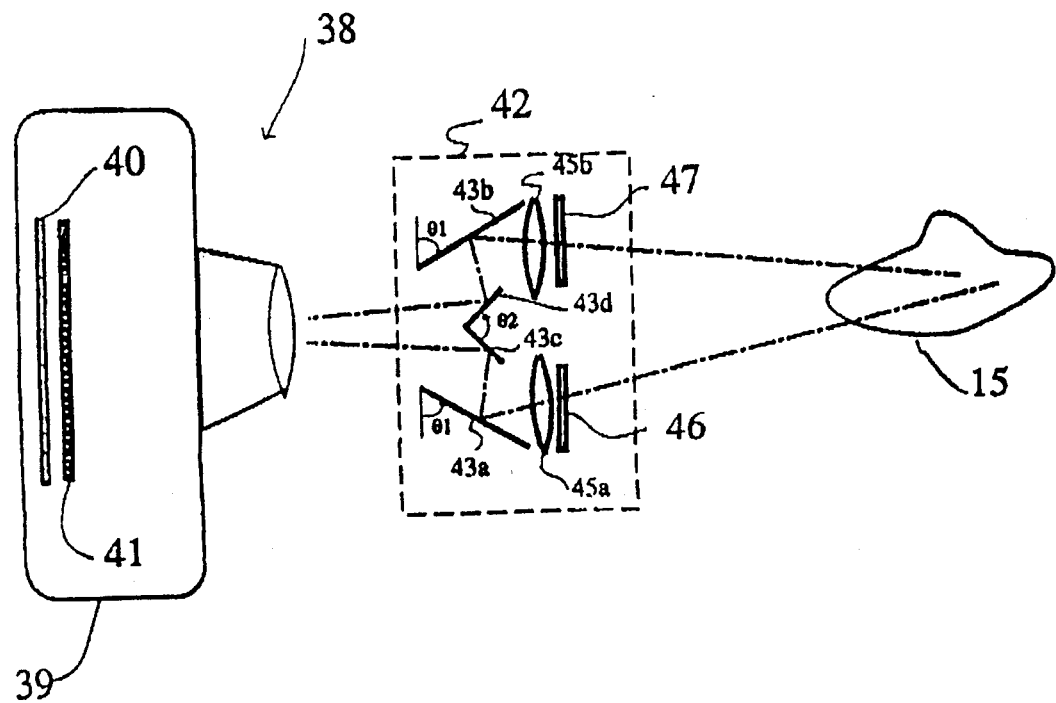
FIGS. 10 and 11 (a)–(b) illustrate an exemplary embodiment of the present invention.

This describes the concept of recording and displaying 3-D images utilizing micro-polarizers as spatial multiplexers and spatial demultiplexer without the use of any electronics, optical shutters or switches, needed in 3-D prior art. With the combination of the micropolarizer and the SMI elements its possible to construct a complete simple system for recording and displaying 3-D images which can be used for multiple purpose applications. During the recording process, the general purpose camera 38 of FIG. 10 is used. It consists of a conventional camera 39 (movie, video or photographic camera) except that the optically sensitive element 40 (film or CCD) is covered with a μPol 41, used here as a spatial multiplexer, and an attachment called an optical combiner 42. The optical combiner 42 comprises an array of mirrors 43 a,b,c,d; a pair of spaced lenses 45 a,b; a conventional polarizer 46 with state P1 for the right perspective view of an object 15, and a conventional polarizer 47 with state P2 for the left perspective view of the object 15. The angles of these passive optical components are so arranged and adjusted that the two images of the object 15 are projected through the μPol 41 and superimposed on the optically sensitive element 40 with perfect alignment. For example, the angle Θ1 for mirrors 43 a,b can be 45°–60° and the angle Θ2, the angle between mirrors 43 c,d, can be 80°–120°. The spacing between the lenses can be 65 mm, which is the average distance between the human pupils. Because of the polarizers in front of the lenses, the projected right image of the object 15 is P1 polarized and the left image is P2 polarized, the micropolarizers 41 carries out the multiplexing function and produces an SMI. The SMI, if recorded on a photographic film, is processed in a conventional manner with existing film processing technologies for motion pictures, off-set printing or conventional photography for consumers. If the SMI is recorded on the optically sensitive element of a video camera, then it is also processed in a conventional manner with existing hardware and transmitted with existing hardware or recorded with a conventional VCR.

Figure 11A:
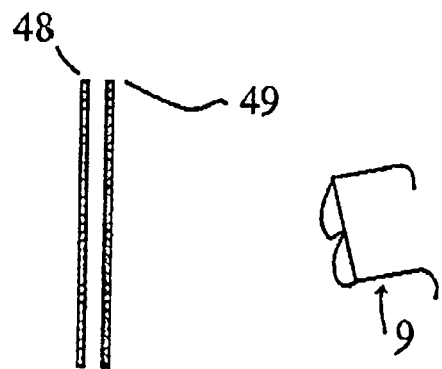
Figure 11B:
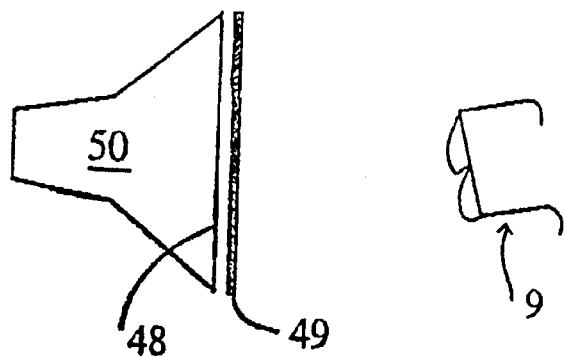

To display a 3-D image, the processed SMI and the μPol combination is used as illustrated in FIG. 9g and also as shown in FIG. 11. If the SMI 48 is recorded on a hard copy such as a photograph, a print from an off-set printer or any other SMI hard copy, a micropolarizer 49 appropriately aligned with the SMI and polarized eye glasses 9 are used to view the 3-D image, as illustrated in FIG. 11a. If the SMI is projected on a screen by projection TV or a movie projector, a micropolarizer is mounted near the projection lens or is arranged to cover the screen. When the SMI is displayed on a CRT 50 screen or liquid crystal display device, the micropolarizer 49 is placed in front of the display, as shown in FIG. 11b.

When the SMI is generated by a computer, it can be printed conventionally by a color thermal printer, a laser printer or a color plotter and then viewed through a micropolarizer mounted directly onto these hard copies. When producing hard copies, the micropolarizer can be fixed permanently to the SMI. Alternatively, a single micropolarizer can be left separated from the SMI for reuse with other SMI's.

The fundamentally new elements of the present invention, the micropolarizer and the SMI combine to produce a fundamentally new 3-D technology that is readily adaptable to general purpose use with existing technologies. The following is a list of advantage over the known 3-D technologies:

1. Human vision is based physiologically and psychologically on having left and right scenes from nature present simultaneously, The present invention is compatible with human vision because both left and right images are recorded and then displayed simultaneously as the SMI. The sequential switching from the left to the right scene, as done in the prior art, strains the eyes and the brain and causes headaches and eye fatigue.

2. The present invention permits simple and inexpensive recording and displaying of 3-D images through the use of already existing technologies and hardware. This compatibility will make the technique of the present invention more readily acceptable for wide spread use. Prior art techniques, on the other hand, need new hardware which is incompatible with existing infrastructure in which massive investments of money, time, and know-how have been incurred over tens of years.

3. The present invention provides the only means for producing 3-D images for general purpose use. One uses the same micropolarizer technology for TV, movies, photography, computer 3-D displays, computer printing and plotting and offset printing. The prior art field sequential method can only be implemented in a limited range of applications. It cannot be used to produce hard copies, as in photography, printing and plotting. Nor can it be used for conventional TV without massive modification of all exiting equipment.

4. Because both the left and right scenes are present simultaneously on the CRT screen, the ghosting problem of the prior art is completely eliminated and the 3-D image quality is improved. This problem afflicted all sequential prior art techniques and manifested itself as cross-talk between the left and right images. It cannot be eliminated because it is a result of the slow decay of the phosphor which is of fundamental importance to the proper operation of the CRT.

5. In the case of 3-D television, the present invention results in a technology which is downward compatible. This means that viewers who do not have 3-D TV sets (do not possess micropolizer), can still receive 3-D programs with their conventional TV receivers but see them as 2-D images. The difference is a slight distortion or blurring which occurs only for close up scenes. This downward compatibility was an important consideration when a decision was being made to adopt a standard for color TV transmission and reception. The standard adopted was that which allowed those who did not possess color TV sets (the majority of people initially) to receive color programs as black and white with their black and white sets. This ensured the success of color TV. In the 3-D field, there is no viable prior art which is downward compatible.

Figure 1:
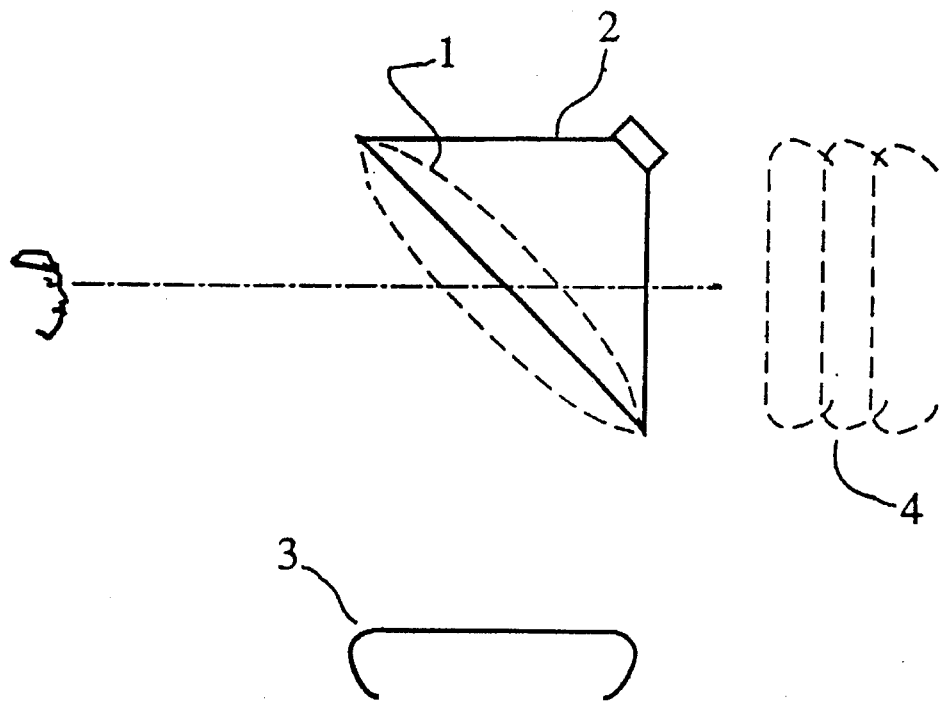
FIG. 1 is an illustration of the verifocal prior art technique for displaying 3-D images without the aid of special eyeglasses.
Figure 2:
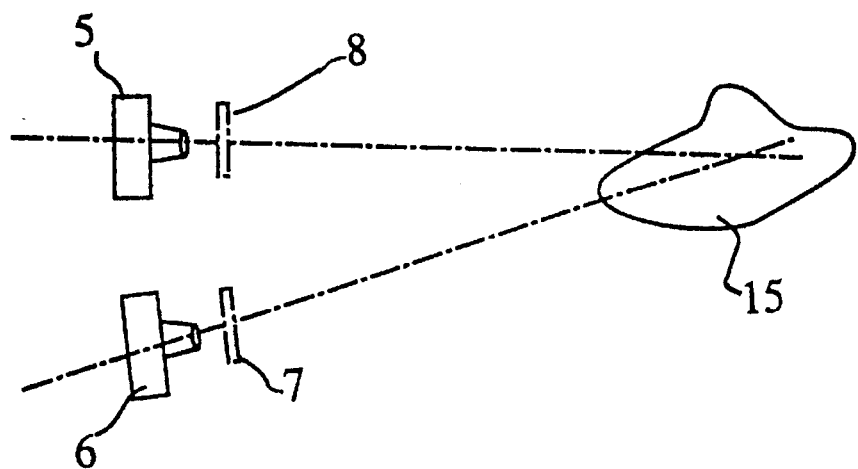
FIGS. 2 and 3 illustrate prior art means for recording and displaying 3-D images requiring the aid of special eyeglasses.
Figure 3:
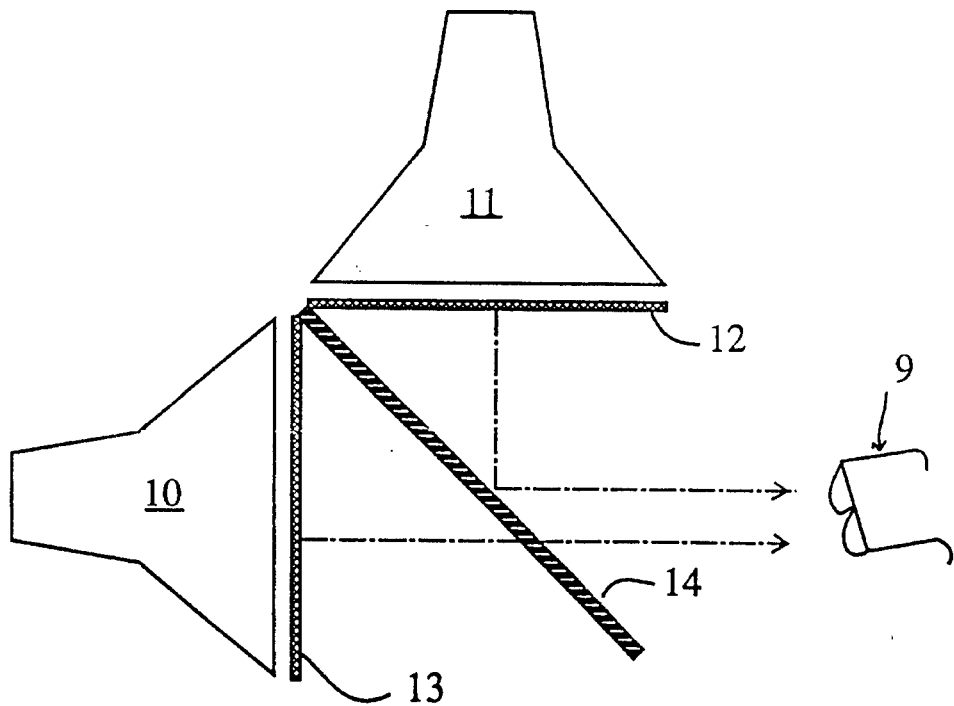
Figure 4:
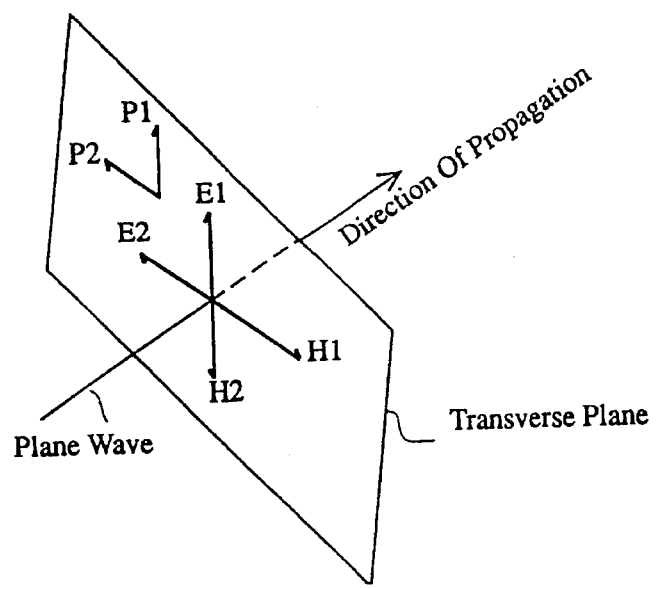
FIG. 4 is a diagram to illustrate the state of polarizations of plane electromagnetic waves such as light from the sun or other light sources.
Figure 5:
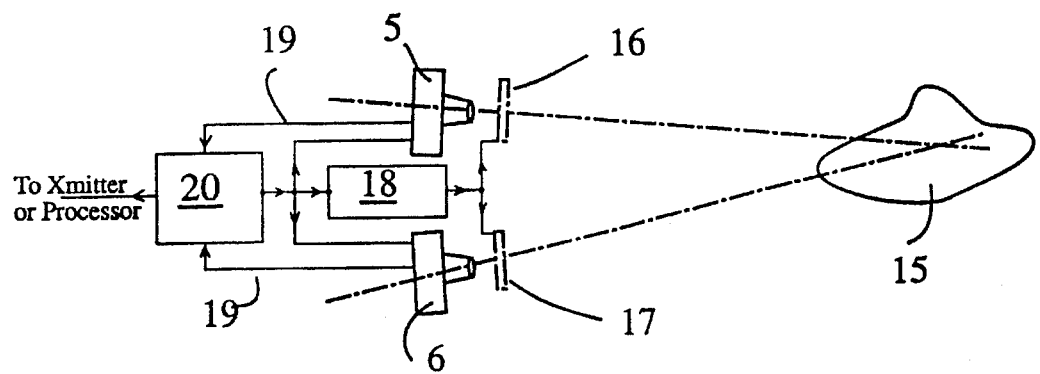
FIGS. 5 and 6 illustrate 3-D recording and displaying apparatuses based on the field sequential technique.
Figure 6:
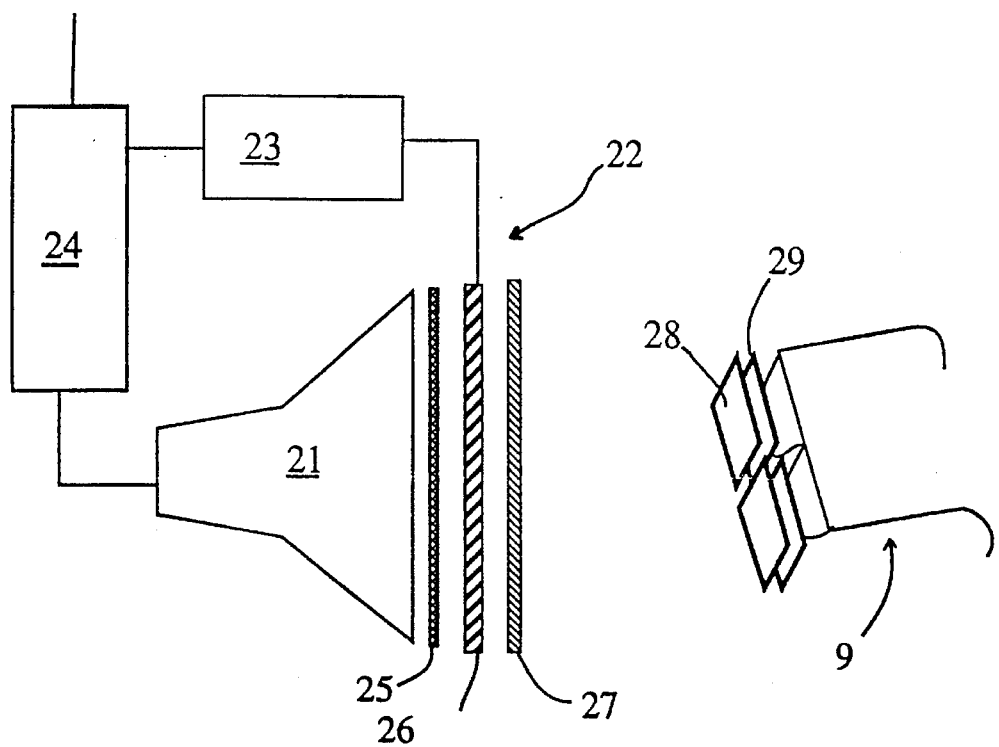
Figure 7:
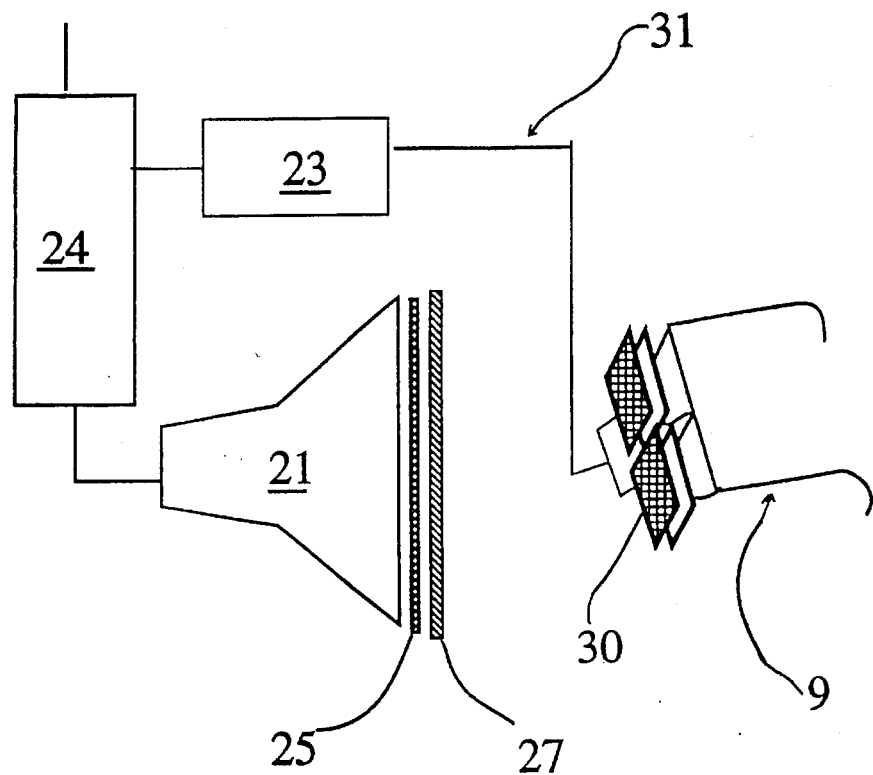
FIGS. 7 and 8 illustrate the use of small LC shutters on eye wear.

6. The present invention eliminates the need for electro-optical shutters, shutter electronics, time multiplexing electronics, and frequency scan converters, the teetered eye glasses, and the IR transmitters and receivers (see FIGS. 6, 7, 8) and therefore significantly reduces the cost.

7. Since in the SMI there is no switching between the left and right scenes, the flicker problem is eliminated and the 3-D image quality is enhanced.

8. The elimination of the liquid crystal shutters eliminates the angle dependence of the display, and improves the image quality and the color quality, and allows more than one viewer at once to see higher quality 3-D displays.

Figure 8:
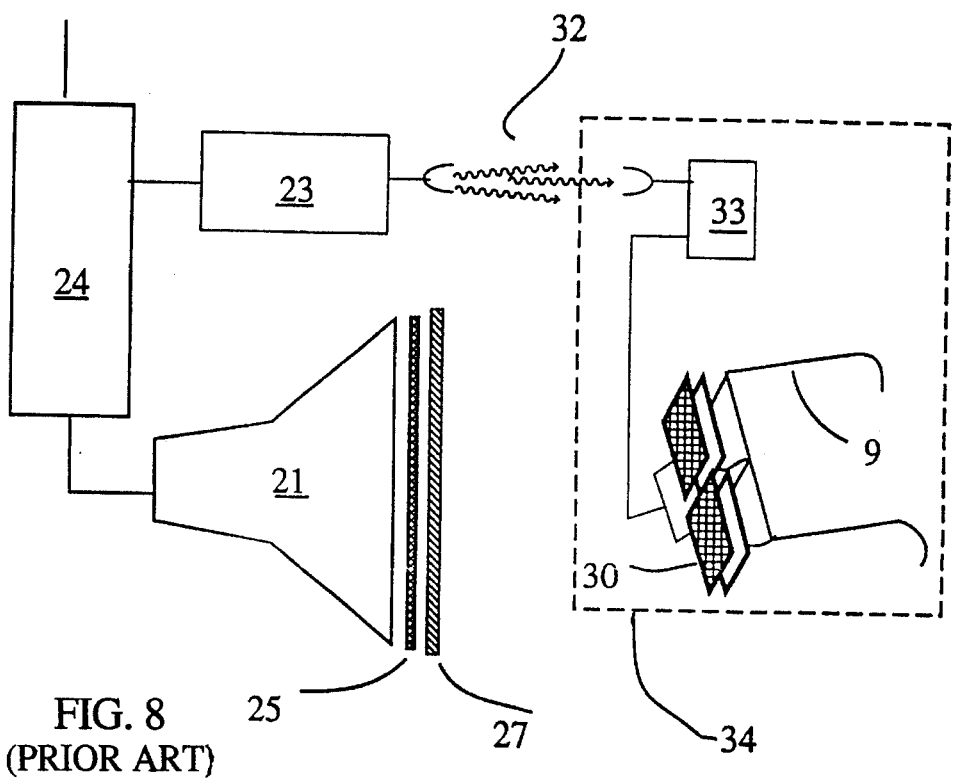

9. The present invention makes it possible for the first time to produce full featured full color 3-D movies (color coding technique does not produce full color 3 D movies) which can be shown in theaters, broadcast for TV and recorded on standard video cassettes. The system shown in FIGS. 10 and 11, when used for movies, only requires a single conventional movie camera, one standard length film reel which has the SMI, a single conventional projector, and the same conventional movie equipment for editing and other functions. On the other hand, generally, prior art polarization coding techniques cannot be used for motion pictures intended for showing in movie theaters and also intended for television broadcast and for use with VCRs. One prior art means to produce movies requires two conventional cameras, two film reels, two projectors and two polarizers placed in front of the projectors. If the 3-D image projected on the movie screen is picked up, transmitted and received with a conventional TV camera and a conventional receiver, the 3-D information is lost. The other prior art means of producing 3-D movies (never attempted) is to use the field sequential technique. One needs special movie cameras with the double the frame rate, the shutters, the sync electronics, and special new projectors. Because it would be prohibitively expensive and technically difficult to make an LC shutter as large as the movie screen, each viewer must wear teetered eye glasses (FIG. 7) or the remote ones (FIG. 8). Even it were produced, such field sequential 3-D movies will not be compatible with standard TV equipment.

A process for fabricating a linear micropolarizer is described below with the aid of FIG. 12 (also Greater details of this fabrication process are discussed in the above mentioned co-pending application Ser. No. 07/536,419). For a mass producible consumer product, the starting material can be a laminate of polyvinyl alcohol (PVA) polarizer 51 and the substrate 52, FIG. 12a. This material can be purchased from the Polaroid Corporation as rolls 19 inches wide and thousands of feet long. The PVA, which is 10 to 20 micron thick, is stretched 3 to 5 times original length and treated with iodine to give it its dichroic (polarizing) property. The PVA treated in this manner crystallizes and becomes brittle. The process below takes advantage of certain chemical properties of the PVA. These are: i) resistance to organic solvents and oils; ii) water solubility, 30% water and 70% ethyl alcohol; iii) bleaching of the dichroic effect in a hot humid atmosphere. The plastic substrate 52, which protects the brittle PVA facilitates handling and processing, is made either of cellulose aceto butyrate (CAB) or cellulose triacetate (CTA), and is typically 50 to 125 micron thick. CAB and CTA are ultra-clear plastics and at the same time they are good barriers against humidity. For some applications, large glass plates are also used as substrates.

Figure 12A:
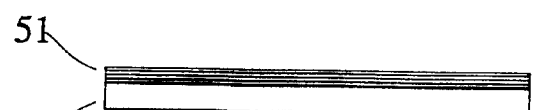
FIGS. 12 (a)–(k) illustrate two processes for manufacturing linear micro-polarizer arrays which are used as spatial multiplexers and demultiplexers, according to the present invention.
Figure 12B:
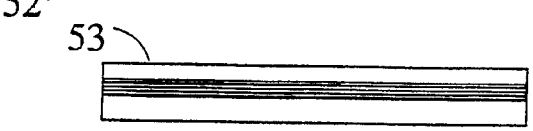
Figure 12C:

The next step, FIG. 12b, is to coat the laminate with photosensitive material 53 such as the photoresist, well known in the semiconductor fabrication art. It is important to use photoresist, which are not water based and can be developed and dissolved with organic solvents which do not attack the PVA. Through a mask having the desired pattern, for example, as illustrated in FIG. 9, the photoresist is then exposed with light, and developed with known developers to remove the unwanted parts of the photoresist and printing the pattern of the mask as in FIG. 12c. The process can take either the path on the left, FIG. 12d–g, or the path on the right, FIG. 12h–k.

Figure 12D:
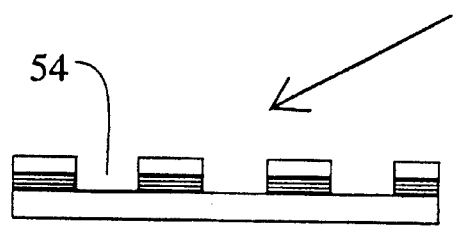
Figure 12H:
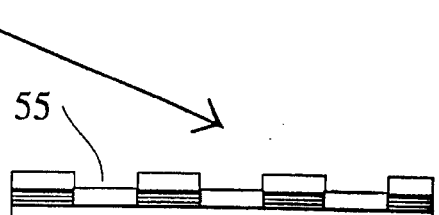
Figure 12E:
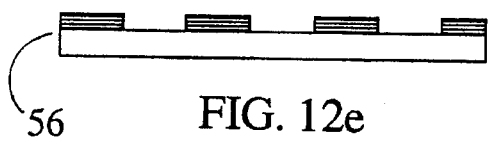
Figure 12I:
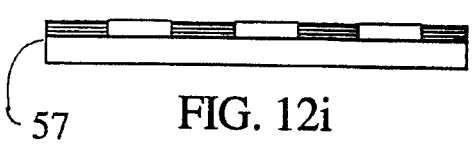
Figure 12F:
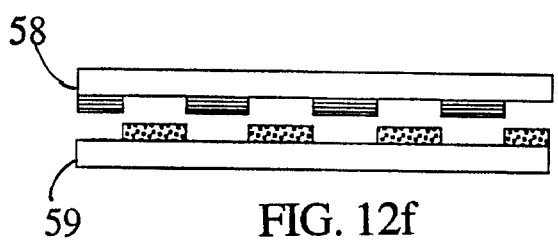
Figure 12J:
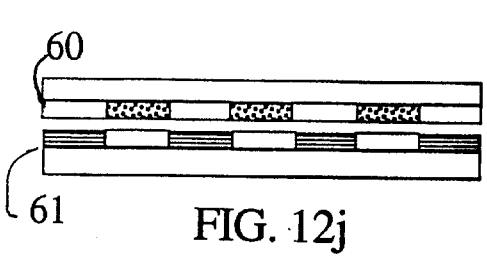
Figure 12G:
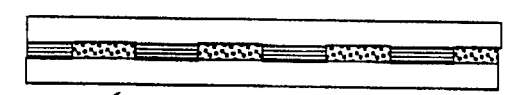
Figure 12K:
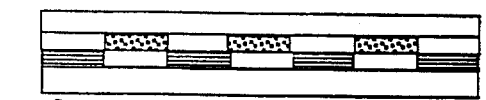
Figure 13A:
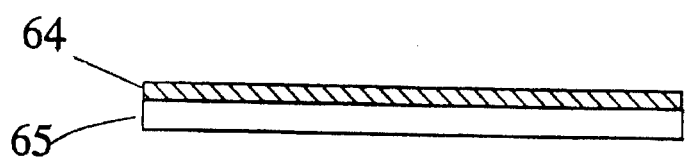
FIGS. 13 (a)–(h) illustrate a manufacturing process for producing circular micro-polarizer arrays.
Figure 13B:
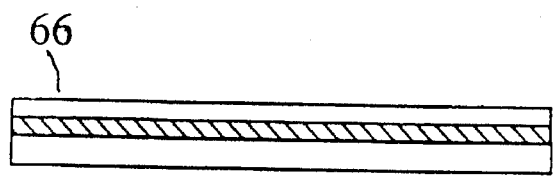
Figure 13C:
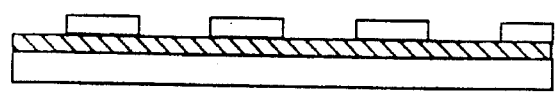
Figure 13D:
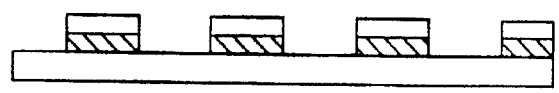
Figure 13E:
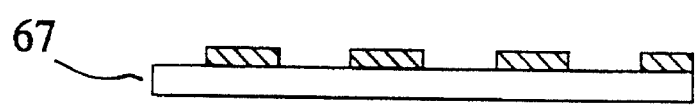
Figure 13F:
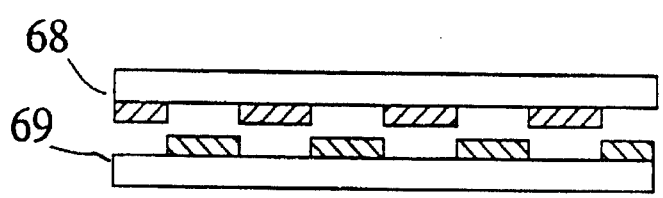
Figure 13G:
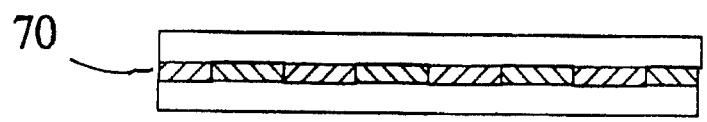
Figure 13H:
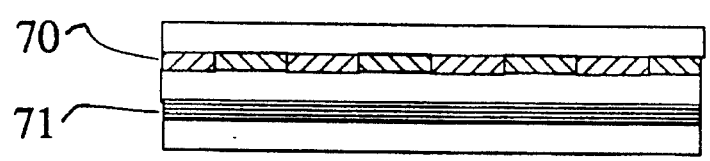
Figure 14A:
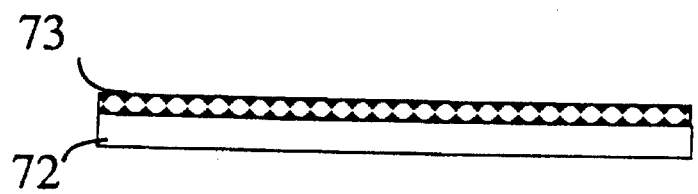
FIGS. 14 (a)–(e) illustrate a manufacturing process for producing linear and circular micro-polarizer arrays.
Figure 14B:
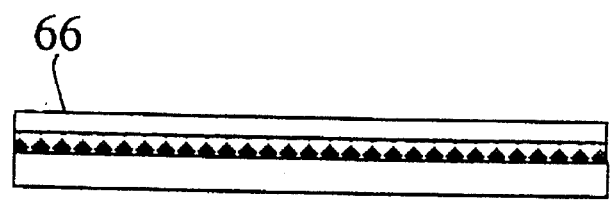
Figure 14C:
Figure 14D:
Figure 14E:
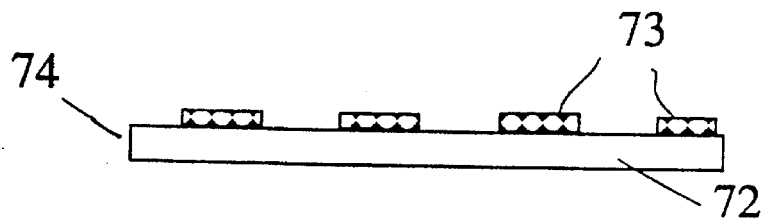
Figure 15A:
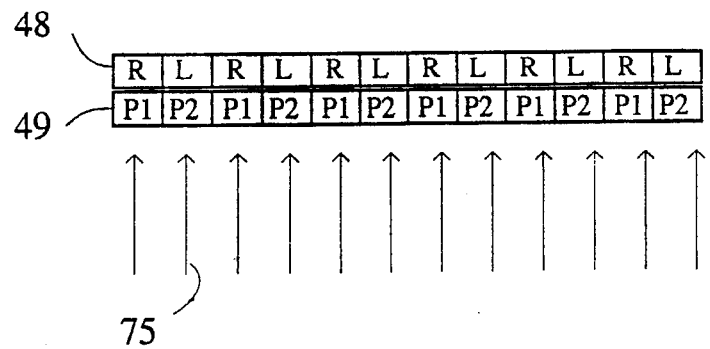
FIGS. 15 (a)–(c) illustrate the use of the micro-polarizer arrays and a spatially multiplexed image in transmissive and reflective modes.
Figure 15A:
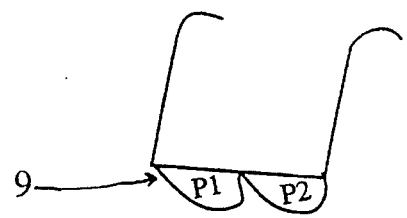
Figure 15B:
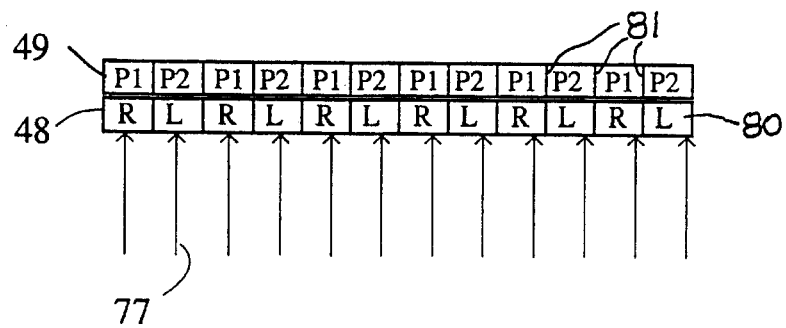
Figure 15C:
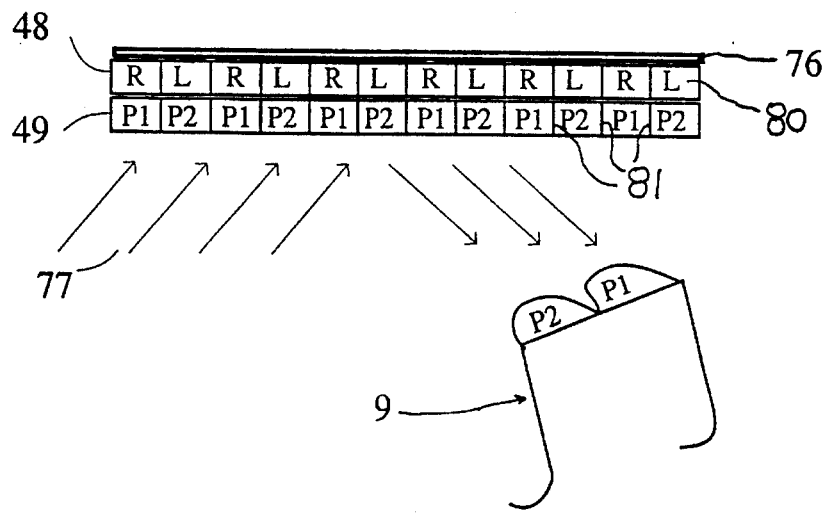

In the left path, the PVA is removed 54 with water/ethyl alcohol mixture or by reactive ion etching means as FIG. 12d. The photoresist is then stripped and the patterned polarizer 56 is obtained. Two such patterned polarizers 58, 59 are rotated 90 degrees with respect to each other. After proper alignment, polarizers 58 and 59 are laminated together to produce the final product, the micro-polarizer 62 in FIG. 12g.

In the right path, FIG. 12h–k, the PVA, instead of being etched, its dichroic effect is bleached by hot humid atmosphere or water based bleachers. This results in the exposed areas 55, FIG. 12h, losing their ability to polarize light, while the areas protected by the photoresist remain as polarizers. The resist is stripped and following the same steps as in d–g, we obtain the final product, the micropolarizer 63 in FIG. 12k. As an alternative to bleaching the opening 55, it is possible to deposit a depolarizer which has strong light scatterer dispersed in it (e.g., wax films depolarizes polarized light completely). While this method is simple, it has a drawback or cutting the brightness by at least a factor of 2.

Following the method illustrated in FIG. 13 it is possible to fabricate circular micropolarizers. One starts with a PVA film 64 and CAB film laminate. In this case the PVA is not a polarizer, instead, it functions as quarter wave or $\pi/2$ retarder. The laminate is obtained in large rolls from the Polaroid Corporation. Applying photoresist, exposing it, developing and etching the PVA are accomplished in the steps, as in FIG. 13a to e. The result is a patterned $\pi/2$ retarder 67. Two such retarders 68, 69 patterned identically, and their optic axes rotated 90 degrees relative to each other are then aligned as in FIG. 13f and laminated together as in FIG. 13g to produce the micro-retarder arrays 70. The final step is to laminate the micro-retarder array 70 to a linear polarizer 71 which has a polarization direction at a 45 degrees angle with respect to the retarder optic axes. The completed circular micropolarizers in FIG. 13h produces a regular array alternating clockwise and counter-clockwise circular polarization suitable for spatial multiplexing and demultiplexing.

The process for producing circular micropolarizers illustrated in FIG. 13 has an important advantage over the linear µPol process of FIG. 12. It is the patterning of the retarder instead of the highly humidity-sensitive linear polarizer. This means that one has a wide spectrum of chemicals for lithographic and etching processes to obtain optimum quality and economical manufacturing. Another advantage is that the retarder can be produced from many materials, polymers and thin films instead of only PVA.

The manufacturing of linear and circular µPols is simplified even further by means of the process shown in FIG. 14. The starting material is a laminate which consists of a sheet 72 of a linear polarizer with a state P1 (oriented 45 degrees relative to optical axes of retarders) or a sheet 72 of a circular polarizer with a state P1, and a half wave or $\pi$ retarder sheet 73. Following steps similar to those of FIG. 12 and 13, the $\pi$ retarder is patterned and the final micropolarization product 74 is obtained as in FIG. 14e. Where the $\pi$ retarder had been etched away, the polarization state P1 of the linear polarizer emerges unchanged. On the other hand, where the patterned retarder remains, the polarization state flips to polarization state P2. Thus, the µPol 74 of FIG. 14e has polarizations which alternate between P1 and P2.

This process has several fundamental advantages: i) only one patterned part is needed instead of two, eliminating the critical alignment step; ii) smaller patterns can be produced;

and iii) much improved image quality and resolution because the SMI can be placed directly onto the patterned π retarder, where as in the previous steps, the protective CAB layer intervenes, and its thickness impacts the resolution.

The final thicknesses of the micropolarizer 62, 63, 71, and 74 range between 150 micron and 300 micron. The substrates in some applications can be glass, and the polarizers can be polarizing color filters where the PVA treated with dye-stuff.

For 3-D imaging, the transmissive or the reflective modes are used as shown in FIG. 15. The transmissive mode, FIG. 15a, is used during the recording of the image where the micropolarizer 49 is used as spatial multiplexer to produce the SMI 48 onto the optically sensitive medium, photographic film or CCD array in the video cameras. In this case the light 75 is polarization coded representing the left and right scenes. The transmissive arrangement in FIG. 15b is used during the display of the 3-D image where the micropolarizer 49 is directly mounted to the display surface of SMI display device 80, and is used as a demultiplexer to separate the left and right images of the SMI. As shown in FIG. 15b, the SMI can be produced by an electro-optical display device, such as a CRT screen or an LCD, or a back lit hardcopy transparency, or movie projector where the light 77 is unpolarized. In a conventional manner, an electro-optical based display device, such as a CRT or LCD, used to produce SMI 48, includes pixel driver circuits and the like to support the display of the SMI on the display screen thereof. The reflective mode, FIG. 15c, is used in hardcopy technologies, where the SMI is printed (permanently fixed) onto the paper or other medium 76 and is illuminated with unpolarized light 77. It is important that the reflective medium be a spectral reflector which preserves the polarization state. As shown in FIGS. 15b and 15c, during the transmissive or reflective mode of SMI display, the two dimensional arrays of square micropolarizers 49 physically interface each other at surfaces 81 which are disposed above and substantially perpendicular to the display surface of SMI display device 80, from which SMI 48 is visually displayed.

When the displayed 3-D image is a magnified version of the recorded image, it is important to use a display µPol which has an array period M times larger than the period of the micropolarizer used for recording, where M is the magnification factor.

Figure 16A:
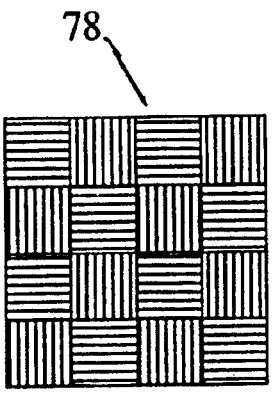
FIGS. 16 (a)–(b) illustrate two examples of micro-polarizer array patterns.
Figure 16B:
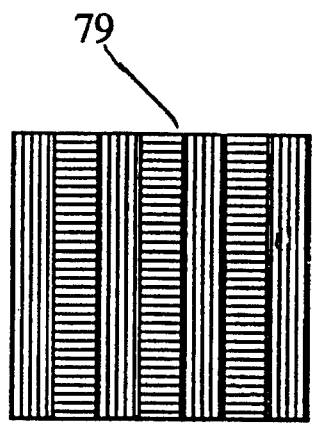

The micropolarizer described in FIG. 9 also shown in FIG. 16a are made of two dimensional arrays of square micro-polarizers with states that alternate between P1 and P2 both in the rows and the columns. Instead of being squares, these micro-polarizers could have any shape, rectangular, triangular hexagonal or any other shape provided that the patterns are regular, and the P1 and P2 patterns are the logical compliments (logical inverse) of each other. Concentric rings for example could be used for spatial multiplexing or the simplest of all, the linear array 79 shown in FIG. 16b.

It is also possible that instead of having only two polarization states as described above, the micropolarizer can be made of a regular array cells each with more than two states. For example, a cell made of two linear polarizations and two circular polarizations. It is possible to record and display as many perspectives or different images as the number of polarization states in each cell.

In addition to the use of light reflected off an object to obtain an image, the present invention can be used with any wave type image source. For example, the image source can comprise wave sources such as a source of electromagnetic radiation including visible light, microwave, infrared, ultraviolet, x-ray, gamma rays, electrons and other elementary particles or a source of sound waves. An appropriate transducer would be used as the recording medium, depending upon the type of wave source being utilized.

What is claimed is:

1. An electro-optical display system for visually presenting a polarized spatially multiplexed image of a 3-D object for use in stereoscopic viewing thereof with high image quality and resolution, said electro-optical display system comprising:

a liquid crystal display device having an image formation surface for forming a composite pixel pattern representative of a spatially multiplexed image composed of first and second spatially modulated perspective images of said object, said first spatially modulated perspective image consisting of a first pixel pattern representative of a first perspective image of said object spatially modulated according to a first spatial modulation pattern, said second spatially modulated perspective image consisting of a second pixel pattern representative of a second perspective image of said object spatially modulated according to a second spatial modulation pattern, said second spatial modulation pattern being the logical compliment pattern of said first spatial modulation pattern;

a micropolarization panel of electrically-passive construction affixed to said image formation surface, said micropolarization panel including
an optically transparent laminate portion directly mounted to said image formation surface and having a thickness dimension on the order of about 10 to about 20 microns,
an optically transparent substrate portion in direct physical contact with said optically transparent laminate portion, for providing support to said optically transparent laminate portion, and
first and second optically transparent patterns permanently formed in said optically transparent laminate portion;
said first optically transparent pattern spatially corresponding to and being spatially aligned with said first pixel pattern formed on said image formation surface so as to impart a first polarization state $P_1$ to light emanating from said first pixel pattern and passing through said first optically transparent pattern;
said second optically transparent pattern spatially corresponding to and being spatially aligned with said second pixel pattern formed on said image formation surface so as to impart a second polarization state $P_2$ to light emanating from said second pixel pattern and passing through said second optically transparent pattern, said second polarization state $P_2$ being different than said first polarization state $P_1$;
said first and second optically transparent patterns physically interfacing each other at surfaces disposed above and substantially perpendicular to said image formation surface; and
said first and second optically transparent patterns each having a spatial period on the order of about 25 to about 5000 microns;
wherein the polarized light emanating from said first and second optically transparent patterns forms a polarized spatially multiplexed image for use in stereoscopic viewing said 3-D object with high image quality and resolution.

2. The electro-optical display system of claim 1, wherein said micropolarization panel has a thickness dimension of about 300 microns or less.

3. The electro-optical display system of claim 1, wherein said first optically transparent pattern comprises a first retardation pattern which imparts said first polarization state $P_1$ to light emanating from said first pixel pattern and passing through said first retardation pattern, and wherein said second optically transparent pattern comprises a second retardation pattern which imparts said second polarization state $P_2$ to light emanating from said second pixel pattern and passing through said second retardation pattern.

4. The electro-optical display system of claim 3, wherein said first retardation pattern comprises a first quarter wave retardation pattern which imparts a clockwise circular polarization state to light emanating from said first pixel pattern and passing through said first retardation pattern, and wherein said second retardation pattern comprises a second quarter wave retardation pattern which imparts a counter-clockwise circular polarization state to light emanating from said second pixel pattern and passing through said second retardation pattern.

5. The electro-optical display system of claim 1, wherein said optically transparent laminate portion further comprises a polarization layer, and said first optically transparent pattern comprises a first retardation pattern, wherein said first retardation pattern imparts said first polarization state $P_1$ to light emanating from said first pixel pattern and passing through said first retardation pattern, and wherein said second optically transparent pattern imparts said second polarization state $P_2$ to light emanating from said second pixel pattern and passing through said second optically transparent pattern.

6. The electro-optical display system of claim 5, wherein said first retardation pattern imparts half-wave retardation to light emanating from said first pixel pattern and passing through said first retardation pattern, and said second optically transparent pattern imparts zero retardation to light emanating from said second pixel pattern and passing through said second optically transparent pattern.

7. The electro-optical display system of claim 5, wherein said polarization layer is characterized by a linear polarization state.

8. The electro-optical display system of claim 7, wherein said first polarization state $P_1$ is a first linear polarization state, and wherein said second polarization state $P_2$ is a second linear polarization state, which is different from said first linear polarization state $P_1$.

9. The electro-optical display system of claim 5, wherein said polarization layer is characterized by a circular polarization state.

10. The electro-optical display system of claim 9, wherein said first polarization state $P_1$ is a clockwise circular polarization state, and wherein said second polarization state $P_2$ is a counter-clockwise circular polarization state.

11. The electro-optical display system of claim 5, wherein said first retardation pattern comprises a first quarter wave retardation pattern which imparts a clockwise circular polarization state to light emanating from said first pixel pattern and passing through said first retardation pattern.

12. The electro-optical display system of claim 1, in combination with an optical viewing device of electrically-passive construction, having
a head supportable frame with which first and second optically transparent elements are supported,
said first optically transparent element being positionable adjacent to the left eye of a viewer, and
said second optically transparent element being positionable adjacent to the right eye of the viewer,
wherein said first optically transparent element is characterized by said first polarization state $P_1$ so as to permit the left eye of the viewer to view said first pixel pattern formed on said image formation surface, while substantially preventing the left eye of the viewer from viewing said second pixel pattern formed on said image formation surface,
wherein said second optically transparent element is characterized by said second polarization state $P_2$ so as to permit the right eye of the viewer to view said second pixel pattern formed on said image formation surface while substantially preventing the right eye of the viewer from viewing said first pixel pattern formed on said image formation surface, and
whereby the viewer is capable of stereoscopically viewing said 3-D object with high image quality and resolution.

13. The electro-optical display system of claim 1, wherein said image formation surface of said liquid crystal display device functions as a display surface suitable for direct stereoscopic viewing of said 3-D object with high image quality and resolution.

14. The electro-optical display system of claim 1, wherein said liquid crystal display device further comprises a projection lens for projecting said polarized spatially multiplexed image onto a remote display surface, for stereoscopic viewing of said 3-D object with high image quality and resolution.

15. An electro-optical display system for visually presenting a polarized spatially multiplexed image of a 3-D object for use in stereoscopic viewing thereof with high image quality and resolution, said electro-optical display system comprising:

a liquid crystal display device having a display surface for visually presenting a composite pixel pattern representative of a spatially multiplexed image composed of first and second spatially modulated perspective images of said object, said first spatially modulated perspective image consisting of a first pixel pattern representative of a first perspective image of said object spatially modulated according to a first spatial modulation pattern, said second spatially modulated perspective image consisting of a second pixel pattern representative of a second perspective image of said object spatially modulated according to a second spatial modulation pattern, said second spatial modulation pattern being the logical compliment pattern of said first spatial modulation pattern;

a micropolarization panel of electrically-passive construction, said micropolarization panel including
an optically transparent laminate portion directly mounted to said display surface and having a thickness dimension of about 20 microns or less,
an optically transparent substrate portion in direct physical contact with said laminate portion, and
first and second optically transparent patterns permanently formed in said optically transparent laminate portion;

said first optically transparent pattern spatially corresponding to and being spatially aligned with said first pixel pattern displayed on said display surface so as to impart a first polarization state $P_1$ to light emanating from said first pixel pattern and passing through said first optically transparent pattern;

said second optically transparent pattern spatially corresponding to and being spatially aligned with said second pixel pattern displayed on said display surface so as to impart a second polarization state $P_2$ to light emanating from said second pixel pattern and passing through said second optically transparent pattern, said second polarization state $P_2$ being different than said first polarization state $P_1$;

said first and second optically transparent patterns physically interfacing each other at surfaces disposed above and substantially perpendicular to said display surface; and said first and second optically transparent patterns each having a spatial period of about 5000 microns or less;

wherein the polarized light emanating from said first and second optically transparent patterns forms a polarized spatially multiplexed image for use in stereoscopic viewing said 3-D object with high image quality and resolution.

* * * * *